United States Patent [19]

Yamashita et al.

[11] Patent Number: 4,929,835

[45] Date of Patent: May 29, 1990

[54] POSITION-SENSITIVE RADIATION DETECTOR

[76] Inventors: Takaji Yamashita; Hiroshi Uchida, both of c/o Hamamatsu Photonics Kabushiki Kaisha, No. 1126-1, Ichino-cho, Hamamatsu-shi, Shizuoka, Japan

[21] Appl. No.: 850,775

[22] Filed: Apr. 11, 1986

[30] Foreign Application Priority Data

Apr. 12, 1985 [JP] Japan .................................. 60-78929
May 28, 1985 [JP] Japan .................................. 60-114790

[51] Int. Cl.$^5$ ............................................. G01T 1/202
[52] U.S. Cl. ..................................... 250/367; 250/369
[58] Field of Search ............ 250/367, 368, 366, 483.1, 250/484.1, 486.1, 487.1, 370.1, 369

[56] References Cited

U.S. PATENT DOCUMENTS

| | | | |
|---|---|---|---|
| 4,069,421 | 1/1978 | Bourdel .............................. | 250/370.1 |
| 4,230,510 | 10/1980 | Cusano et al. ....................... | 250/367 |
| 4,234,792 | 11/1980 | DeCou et al. ........................ | 250/367 |
| 4,267,453 | 5/1981 | Kieboom et al. ..................... | 250/487.1 |
| 4,274,002 | 6/1981 | Tomita ................................ | 250/366 |
| 4,292,538 | 9/1981 | Carlson .............................. | 250/367 |
| 4,326,077 | 11/1980 | Sonoda et al. ....................... | 250/367 |
| 4,437,007 | 3/1984 | Koslow et al. ....................... | 250/366 |
| 4,490,615 | 12/1984 | Riihimaki et al. ................... | 250/487.1 |
| 4,560,882 | 12/1985 | Barbaric et al. ..................... | 250/367 |
| 4,631,409 | 12/1986 | Sparacia et al. .................... | 250/483.1 |
| 4,675,526 | 6/1987 | Rogers et al. ....................... | 250/368 |

OTHER PUBLICATIONS

Kume et al, "Newly developed PMT's with position sensitivity capability" IEEE Nucl. Scien. vol. NS-32, No. 1 (Feb. 85) pp. 448–452.

Hoftiezer et al., "A ... Position-Sensitive Scint. Hodoscope", Nucl. Inst. & Meth. 147, No. 3, Dec.–77, p. 465.

Rogers et al., "Position Sensitive Scint. Det." Nucl. Inst. & Meth. 121, No. 3, Nov. 1974, p. 599.

C. A. Burnham et al., Design of a Cylindrical Shaped Scintillation Camera for Positron Tomographs, IEEE Transactions on Nuclear Science, vol. NS-32, No. 1, pp. 889–893 (Feb. 1985).

Uchida et al., Design of a Mosaic BGO Detector System for Positron CT, IEEE Transactions on Nuclear Science, vol. NS-33, No. 1, Feb. 1986.

Hidehiro Kume et al., Position Sensitive Photomultiplier Tubes for Scintillation Imaging, IEEE Transactions on Nuclear Science, vol. NS-33, No. 1, Feb. 1986.

*Primary Examiner*—Janice A. Howell
*Assistant Examiner*—Richard Hanig

[57] ABSTRACT

A position-sensitive radiation detector includes an array of scintillator elements having roughly-polished radiation incident ends, mirror-polished sides, and mirror-polished light output ends. The elements are separated by a media having a lower index of refraction and at least the incident ends are coated with a reflection material. A photocathode opposite to the light output ends outputs photoelectrons at locations corresponding to the scintillator elements receiving incident radiation. An incident electron detecting unit and an arithmetic unit generate data representing the position and intensity of radiation incident upon the scintillator elements.

16 Claims, 7 Drawing Sheets

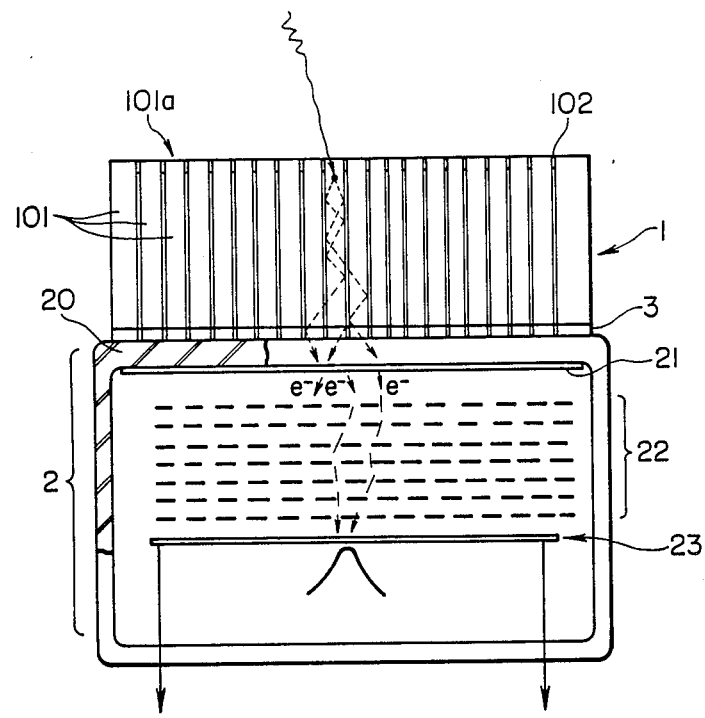
FIG. 3
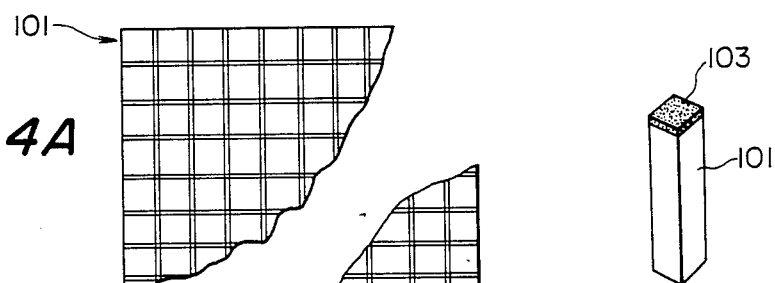
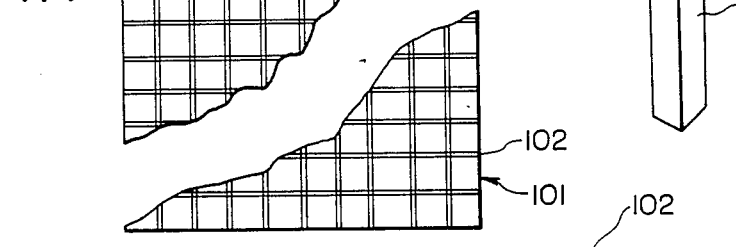
FIG. 4A
FIG. 4B
FIG. 4C

1

POSITION-SENSITIVE RADIATION DETECTOR

FIELD OF THE INVENTION

This invention relates to a position-sensitive detector for radiation which may be utilized for radiation measurement or the like.

BACKGROUND OF THE INVENTION

A gamma camera (or scintillation camera) and a positron emission computed tomography position CT detector are known as examples of the systems which utilize position-sensitive radiation detectors. The gamma camera, as shown in FIG. 1, comprises a thin scintillator 70 of sodium iodide (NaI (TL)) which is 5 to 15 mm in thickness and a light guide 71 disposed on the light output surface (lower surface) of the scintillator 70. Light emitted by the scintillator 70 is applied through the light guide 71 to a number of photomultipliers 72.

More specifically, the scintillator 70 emits light when excited by radiation, and the emitted light is applied through the light guide 71 to the photomultipliers 72 while spreading. The gamma camera further comprises a position calculating circuit 73 for determining an incident radiation position according to the ratio of light quantities distributed to the photomultipliers 72.

FIG. 2 shows a detector arrangement for use in the positron CT which includes a plurality of BGO scintillators 80 that are coupled through a light guide 81 to a plurality of photomultipliers 82. The detector further comprises a position calculating circuit 83 for detecting which scintillator has emitted light in response to incident radiation by comparing the outputs of the photomultipliers 82.

In the above-described gamma camera, the scintillator is relatively small in thickness. Therefore, in order to absorb high energy radiations effectively, it is necessary to increase the thickness of the scintillator. If the thickness of the scintillator is increased, however, the spatial spread of the light emitted by the scintillator upon application of the radiation is increased in the scintillator. In addition, it is necessary to increase further the spatial spread of the light in order to distribute the light to a suitable number of photomultipliers. Therefore, it is difficult for the gamma camera to have a high spatial resolution.

On the other hand, the detectors used in the positron CT detector uses a number of scintillators, as was described above. Since each scintillator is smaller in size than a photomultiplier, it is also necessary to increase the spatial spread of light to some extent. Therefore, this type detector also suffers from the difficulty of low spatial resolution. Furthermore, the detector in the positron CT detector is intricate in mechanical construction because it uses a number of photomultipliers.

In general, the spatial resolution (R) of a detecting system which adopts centroid calculation algorism in position detector, can be defined by the following expression:

$$R \propto S/(N)^{\frac{1}{2}}$$

where N is the quantity of light produced per radiation, and S is the spatial spread of the light produced. As is apparent from the expression, in order to decrease the positional resolution, it is necessary to decrease the spatial spread S, even if a centroid calculator is provided in a position detector.

OBJECT AND SUMMARY OF THE INVENTION

An object of the present invention is a position-sensitive radiation detector having improved spatial resolution.

Another object of the present invention is a position-sensitive radiation detector having reduced spatial spreading of output light.

A further object of the present invention is a position-sensitive radiation detector that is small in size and simple in operation.

The foregoing objects and other objects of the present invention have been achieved by a position-sensitive radiation detector comprising a plate-shaped scintillator made up of a number of scintillator elements, each of the elements being a quadrangular prism of high atomic number scintillator material having mirror polished side surfaces and roughly-ground incident end face; a light incident position detecting tube having a photocathode confronted with an output surface of the scintillator so that photoelectrons emitted from the photocathode, after being multiplied and corresponded to the incident position thereof, are applied to an two-dimensional position detecting unit to output data representing photoelectron generation position; and an arithmetic unit for processing an output of the light incident position detecting tube to output data representing the position and intensity of radiation applied to the scintillator.

BRIEF DESCRIPTION OF THE DRAWINGS

The manner by which the above objects, and other objects, features, and advantages of the present invention are attained will become fully apparent from the following detailed description when it is considered in view of the drawings, wherein:

FIG. 3 is a sectional view showing one example of the assembly of a scintillator and a light incident position detecting tube in a radiation incident position detecting device according to the present invention;

FIGS. 4A and 4B are a front view and a side view of the scintillator of FIG. 3, and FIG. 4C is a perspective view showing one of the scintillator elements that form the scintillator of FIG. 3;

DETAILED DESCRIPTION

Figure 1:
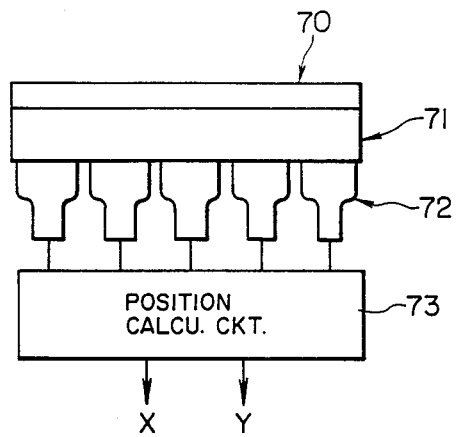
FIG. 1 is an explanatory diagram outlining the arrangement of a conventional gamma camera.
Figure 2:
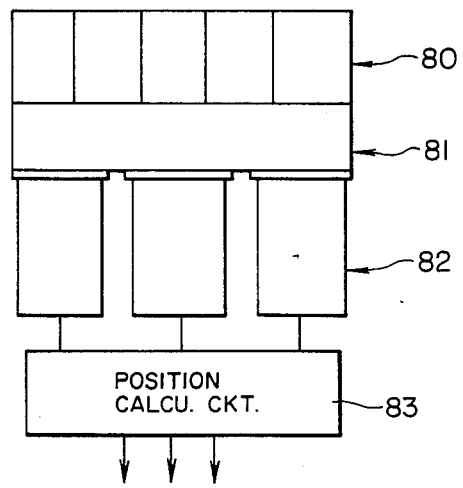
FIG. 2 is an explanatory diagram outlining the arrangement of a conventional detector for use in a positron CT.

This invention will be described with reference to the accompanying drawings.

FIG. 3 is a sectional view of an example of the assembly of a scintillator 1 and a light incident position detecting tube 2 in a position-sensitive radiation detector according to the invention. In FIG. 3, reference numeral 3 designates an optical connecting means. FIGS. 4A and 4B are a front view and a side view, respectively, of the scintillator 1. FIG. 4C is a perspective view of one of the scintillator elements 101 which forms the scintillator 1.

The scintillator 1 is made up of a number of scintillator elements 101 bundled in the form of a plate with spacers. The scintillator elements 101 are, for instance, quadrangular prisms of bismuth germanium oxide (BGO) having a high atomic number. Each scintillator element 101 is about 15 mm in length and 3 mm in sectional area.

One end face (the incident surface 101a) of each scintillator element 101 is roughly-ground, and the other surfaces are polished to a mirror-finish. The roughly-ground end face is coated with barium sulfate (BaSO4) to form a reflection layer 103, as shown in FIG. 4C. The coated incident surface 103a is a diffusion reflection surface. Therefore, the probability that a light beam applied thereto will be reflected changes with cosine of the critical angle between the light beam and the normal to the surface 103.

As shown in FIGS. 4A and 4B, the scintillator 1 is prepared in the form of a plate by arranging the scintillator elements 101 in a plane with the spacers 102 interposed between the scintillator elements to form air gaps therebetween. Upon the incidence of radiation, a scintillation light is produced in a scintillator element 101. A larger part of the scintillation light is totally reflected by the air interface because of its small refractive index and emerges out of the scintillator element 101 through the other end face (opposite to the reflection surface 103) after being intricately reflected thereby.

The refractive index of a BGO scintillator element is 2.1, and that of the air is 1.0. Therefore, light beams incident to the air interface at an angle of 28° or higher are totally reflected. The light beams that pass through the air interfaces are utilized by adjacent scintillator elements for measurement.

Each scintillator element 101 is substantially similar in function to an optical fiber. Therefore, the spatial spread of the optical output is limited in the section of the scintillator element which has produced the light.

Figure 5:
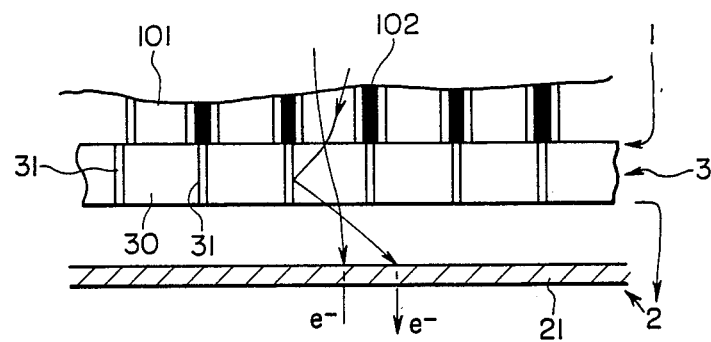
FIG. 5 is a sectional view showing one example of an optical connecting means through which the scintillator of FIG. 3 is coupled to the light incident position detecting tube.

FIG. 5 is a sectional view showing one example of an optical connecting means 3 for optically connecting the output surface of the scintillator 101 and the incident surface of the light incident position detecting tube 2 that is shown in FIG. 3.

As shown in FIG. 5, the optical connecting means 3 comprises a plurality of transparent glass blocks 30 that are square in section and are joined in the form of a plate through reflection layers 31 of barium sulfate (BaSO4).

The refractive index of the BGO scintillator element is 2.1, and that of glass is smaller than 2.1. Therefore, a light beam applied to the transparent glass block 30 of the optical connecting means 3 from the scintillator 1 tends to spread; however, it is reflected upon reaching the reflection layer 31.

Figure 6:
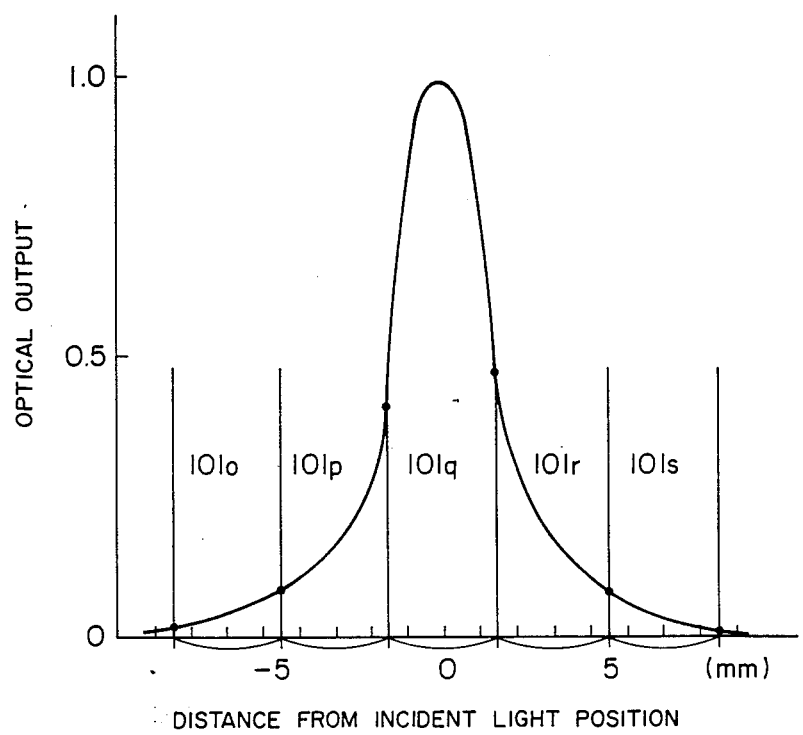
FIG. 6 is a graphical representation indicating the characteristics of the scintillator of FIG. 3.

FIG. 6 is a diagram showing one example of the distribution of optical outputs measured using the assembly shown in FIG. 3. In this case, BGO scintillator elements 101 having dimensions of 3 mm×3 mm×15 mm are assembled into a scintillator with the aforementioned spacers 102 interposed therebetween. The optical outputs of the scintillator elements 101o through 101s are measured when only the central scintillator element 101q is exposed to radiation.

The scintillator elements 101p and 101r adjacent to the central scintillator element 101q, and the scintillator elements 101o and 101s provide optical outputs attributable to the leakage of light incident to the side of the scintillator element substantially at right angles.

In the above-described embodiment, the scintillator elements are set adjacent to one another with only air interfaces therebetween. The same effect can be obtained by joining the scintillator elements together with a transparent adhesive having a smaller refractive index than the scintillator elements.

As shown in FIG. 3, the output light of the scintillator 1 reaches a photocathode 21 through a glass window 20 of the light incident position detecting tube 2, and causes the photocathode 21 to emit photoelectrons. The photoelectrons thus emitted are applied to a group of dynodes 22 arranged in the form of a mesh, where they are subjected to photomultiplication while maintaining their spatial spread, and are then applied to a resistive division type anode 23.

The resistive division type anode 23 has four output terminals. The incident position and the quantity of the photoelectrons thus multiplied are outputted as data through the output terminals. The calculations of the incident position and the quantity will be described later.

An example of a calculating device for processing the output of the light incident position detecting tube to output the position and intensity of radiation incident to the scintillator will be described with reference to the case where a positron emission computed tomography system (positron CT) is formed with a plurality of assemblies each comprising the scintillator 1 and the light incident position detecting tube 2.

The positron CT measures the distribution of positron-emitting nuclides in the body through out the body.

A kind of isotope emits positrons through decay. The positrons thus emitted lose energy through collisions while advancing less than several millimeters in a human body, and annihilate by combining with electrons. The rest mass of the positron and electron is converted to two gamma rays of 511 keV, being radiated in the opposite directions.

If the 511 keV gamma ray energy is detected by detectors, and the positions of the gamma rays incident to the detectors are obtained, then the radiation source is located on the line that connects the detectors.

The gamma rays which reach the detectors substantially at the same time are only detected by using coincidence counting technique and the data are stored, so that the image is reconstructed by using a computer and the image of positron-emitting nuclides distribution in the body is obtained.

Figure 7:
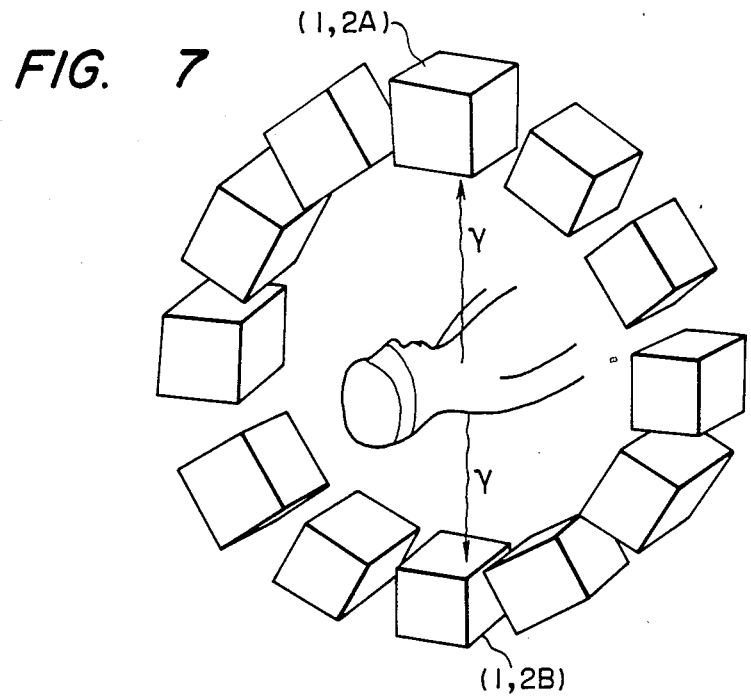
FIG. 7 is a perspective view showing a number of scintillator and light incident position detecting tube assemblies according to the present invention which are applied to a positron CT device.

FIG. 7 shows an example of an arrangement of detector assemblies, each of which comprises the scintillator 1 and the light incident position detecting tube 2 (hereinafter referred to merely as "assemblies", when applicable). The assemblies are arranged around a body under examination.

Figure 8:
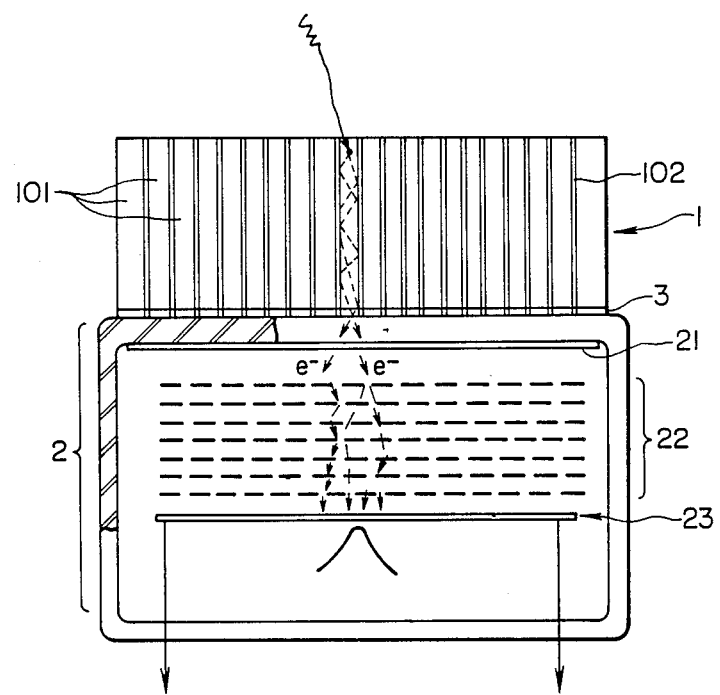
FIG. 8 is a sectional view showing a second example of a scintillator and a light incident position detecting tube assembly according to the present invention.
Figure 9A:
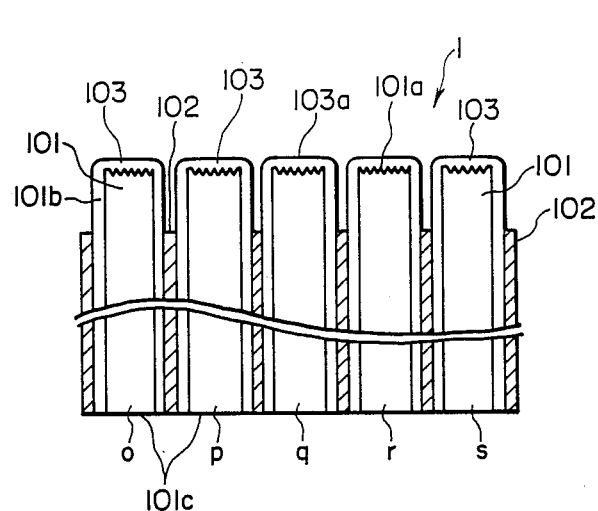
FIG. 9A is an enlarged sectional view showing a part of the scintillator of FIG. 8.
Figure 9B:
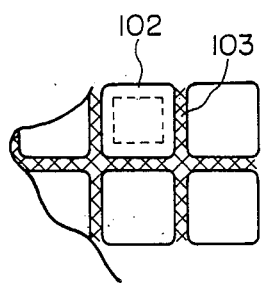
FIG. 9B is an enlarged diagram of a part of the scintillator of FIG. 8 as viewed from the radiation incident surface.

FIG. 8 is a sectional view showing a second example of the assembly described with reference to FIG. 3. FIGS. 9A and 9B are a sectional view and a front view of the assembly shown in FIG. 8, respectively. In these figures, parts corresponding functionally to those already described with reference to FIGS. 3 and 4A through 4C are designated by the same reference numerals and characters.

In the device of FIG. 8, the scintillator 1 is made up of a number of scintillator elements 101 that are bundled in the form of a plate with radiation shielding members serving as spacers. The scintillator elements 101 are made of bismuth germanium oxide (BGO) having a high atomic number. Each scintillator element has one end face 101a that is roughly-ground (FIG. 9A), and the other surfaces thereof are mirror finished.

In the first example of FIG. 3, the total reflection layer 103 of barium sulfate (BaSO4) is formed on the incident surface only. In the second example, as shown in FIGS. 9A and 9B, the incident surface 101a and the mirror-finished side surfaces 101b are coated with barium sulfate. Consequently, reflection layers 103 are formed not only on the incident surface 101a but also on the side surfaces 101b of each scintillator element 101. The radiation shielding members are, for instance, plates made of tungsten.

The coated incident surface 103a is a diffusion reflection surface. Therefore, the probability that a light beam applied thereto will be reflected changes with cosine of the critical angle between the light beam and the normal to the surface 103. When the incident angle of a light beam to a side surface 101b is larger than the critical angle, most of the light beam is totally reflected thereby so that it is transmitted to the output surface 101c. When the incident angle is smaller than the critical angle, most of the light beam advances to the reflection layer 103 from the body of the scintillator element 101, so that it is subjected to diffusion reflection into the body of the scintillator element.

The scintillation light produced in a scintillator element 101 of the scintillator upon the incidence of radiation is reflected by the reflection layer 103, so that it is outputted after being intricately reflected in the scintillator element.

As in the first example, each scintillator element is substantially similar in function to an optical fiber. Therefore, the spatial spread of the optical output is limited in the section of the scintillator element that has produced the light.

Figure 10:
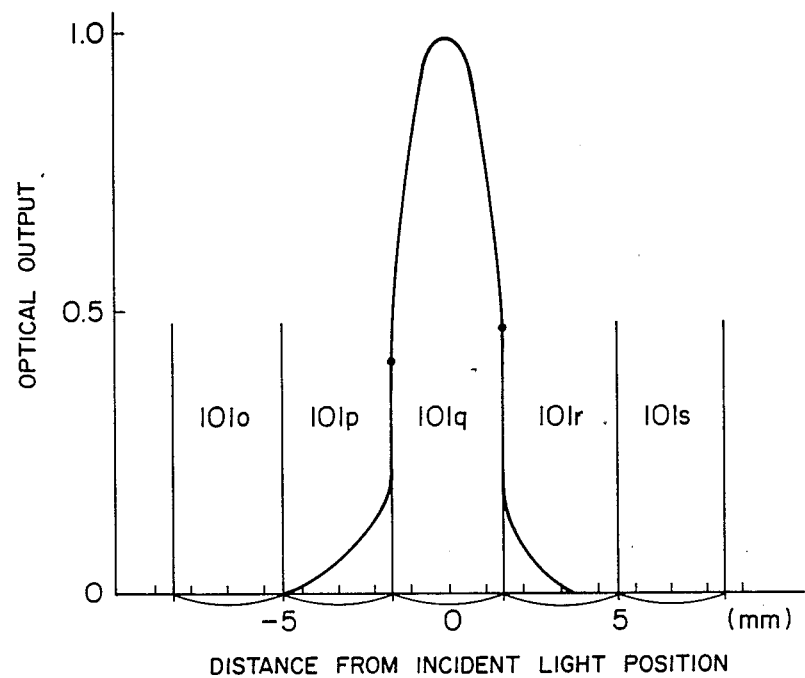
FIG. 10 is a graphical representation indicating the characteristics of the scintillator shown in FIG. 8.

FIG. 10 is a diagram showing another example of the distribution of optical outputs measured using the assembly shown in FIG. 8. Since the mirror-finished side surfaces 101b are coated with barium sulfate, as is clear from FIG. 10, the leakage of light through the side surfaces thereof to the adjacent scintillator elements is reduced from that in the first example of FIG. 3.

Figure 11:
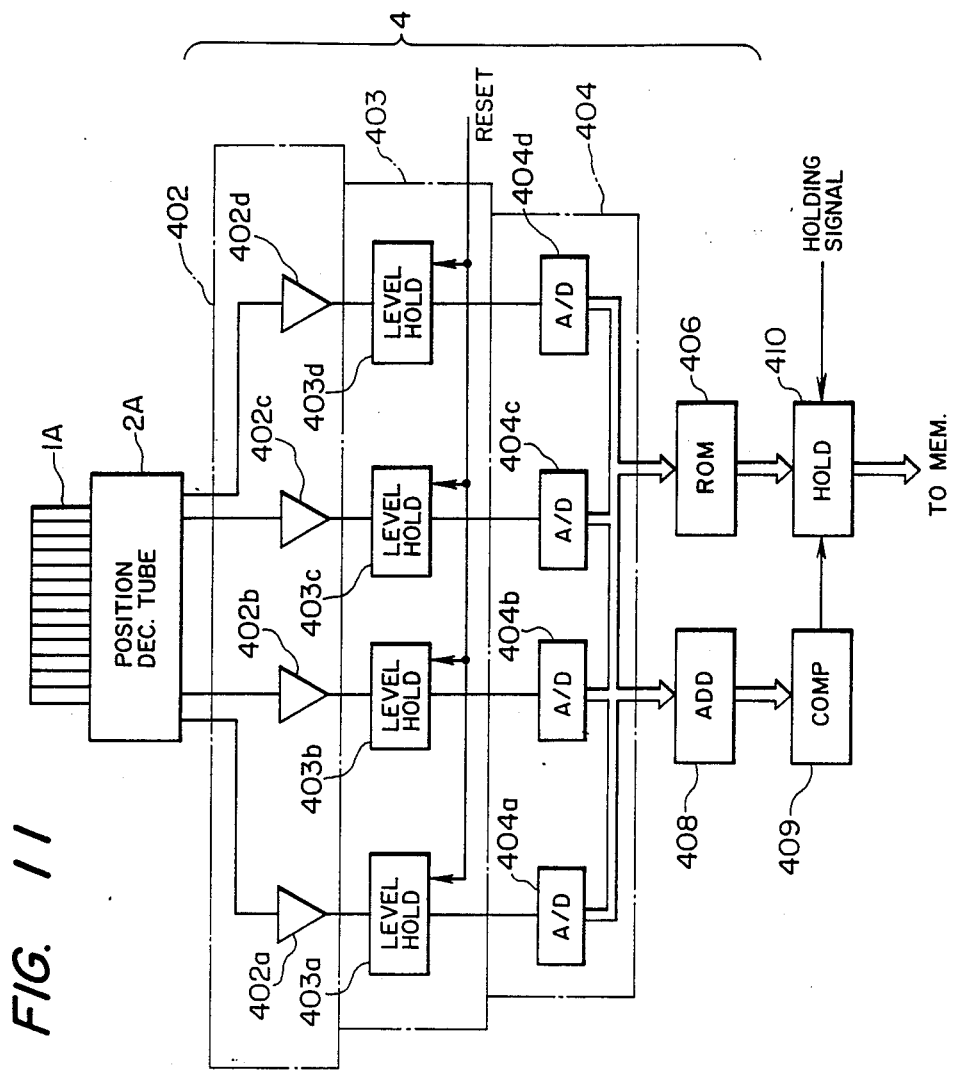
FIG. 11 is a block diagram showing one example of an incident position calculating unit for the light incident position detecting tube of FIG. 8.

Now, a position calculating circuit provided for each light incident position detecting tube to calculate an electron incident position will be described with reference to FIG. 11. The four outputs bearing the position data of the electrons applied to the resistive division type anode 23 are amplified by high-speed amplifiers 402a, 402b, 402c and 402d, respectively. The outputs of the high-speed amplifiers 402a through 402d are applied to integration and level hold circuits 403a through 403d, respectively, where they are converted into signals having voltages that are proportional to currents from the output terminals of the resistive division anode 23. The outputs of the integration and level hold circuits 403a through 403d are subjected to analog-to-digital conversion in A/D (analog-to-digital) converters 404a through 404d, respectively. The outputs of the A/D converters 404a through 404b are applied to a ROM (read-only memory) 406. These four inputs determine an incident position (X,Y) according to a table which has been stored in the ROM 406.

The outputs of the A/D converters 404a through 404d are also applied to a digital adder 408, where they are summed. The result of the addition is compared with a reference level in a comparator 409, and when it exceeds the reference level, it is applied to a hold circuit 410.

The integrating operations of the integration and level hold circuits 403 take relatively long periods of time. Therefore, in the case where the above-described simultaneous counting operation cannot be achieved during integration the pulse signal is reset as an unstable signal. As a result, the circuits become ready for the following pulse, which increases the speed of operation of the device.

Figure 12:
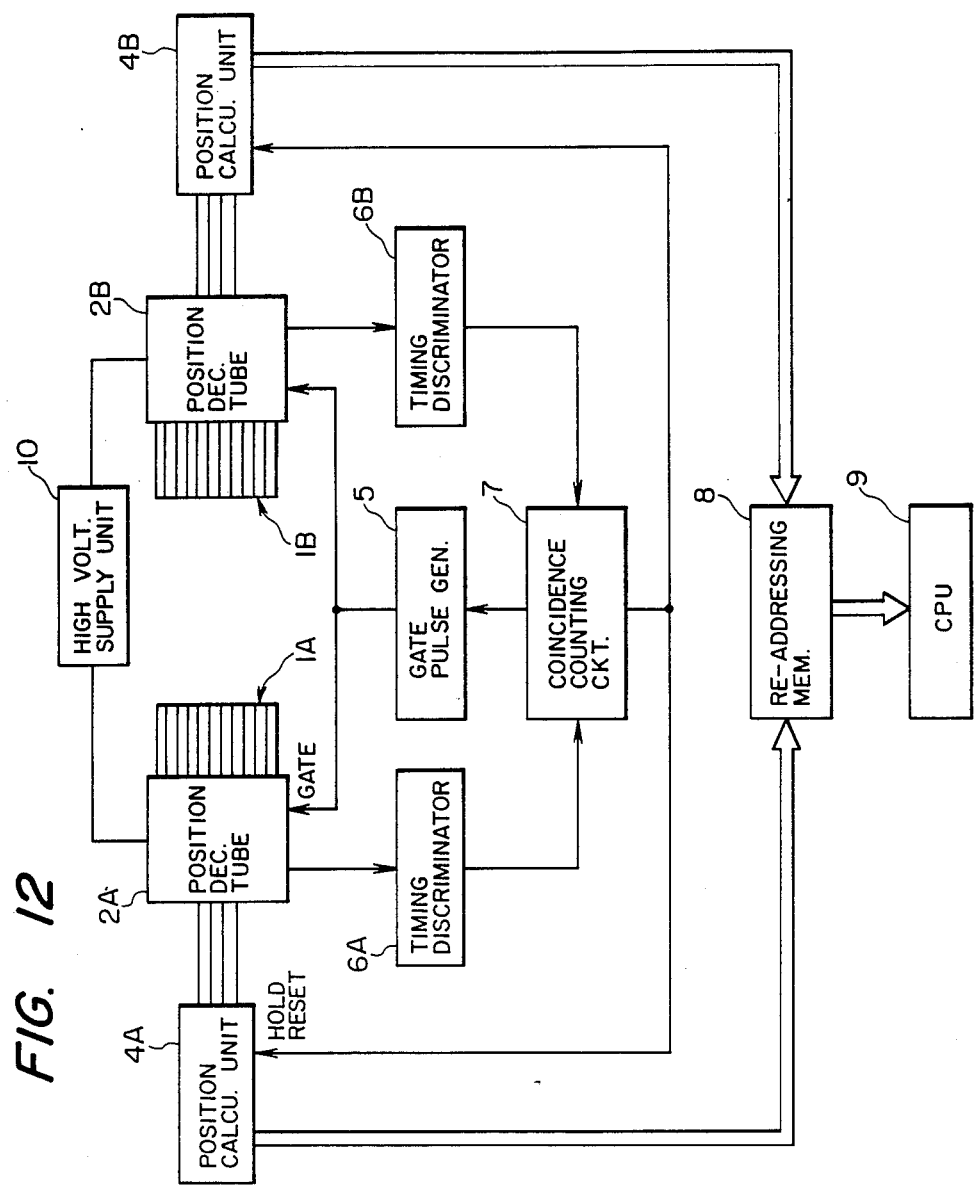
FIG. 12 is a block diagram showing one example of an incident position calculating unit for a positron CT device.

The device of the present invention will next be described with reference to a first assembly comprising a scintillator 1A and a light incident position detecting tube 2A and a second assembly comprising a scintillator 1B and a light incident position detecting tube 2E which are disposed on both sides of a body. FIG. 12 is a block diagram showing one example of an output processing circuit for the first and second assemblies in a positron CT device.

As shown in FIG. 12, an operating voltage is applied to the light incident position detecting tubes 2A and 2B by a high voltage supplying unit 10. Position calculating units 4A and 4B calculate the outputs of the light incident position detecting tubes 2A and 2B, to determine an incident position. A gate pulse generating unit 5 operates to generate a gate pulse so that the light incident position detecting tubes 2A and 2B are operated only when required. Timing discriminators 6A and 6B receive signals from the last stages of the dynode groups in the light incident position detecting tubes 2A and 2B, respectively, to detect the incidence of light. A coincidence counting circuit 7 issued to detect that the timing discriminators 6A and 6B provide outputs simultaneously and that gamma rays are applied to the two scintillators at the same time. Upon detection of these conditions, the coincidence counting circuit 7 provides outputs.

The above-described hold circuits 403 receive the incident position signals from the respective position calculating units 4 and simultaneously hold them only when two timing signals are detected within about 20 ns.

The gate pulse generator 5 is driven to apply reverse voltage across the initial few stages of the photomultiplying section and the photoelectric conversion surface in each of the detecting devices to make the light detection free from unnecessary load for about 1 s, corresponding to the time instant that the position calculating circuit performs the signal processing operation until the time instant that the data are transmitted to the succeeding memory.

Further in FIG. 12, a re-addressing memory 8 operates to rearrange the output data of the position calculating units according to the conversion table, and to store the output data thus rearranged, for operation to produce a tomographic image. A CPU 9 processes the contents of the re-addressing memory 8 to reconstruct the tomographic image.

As is apparent from the above description, with the device of the present invention the high energy gamma rays can be detected with high efficiency and with high positional resolution.

Furthermore, as the device is simple in construction, it can be readily manufactured. In addition, a small number of processing circuits follow the device, and the processing circuits themselves may be simple in arrangement.

While two preferred embodiments of the present invention, have been described, it will be readily apparent to those skilled in the art that various changes and modifications may be made therein without departing from the spirit and scope of the invention. For instance, the mesh electrode may be replaced with a micro channel plate, and instead of the resistive division type anode, a multi-anode may be used.

What is claimed is:

1. A position-sensitive radiation detector comprising:
a scintillator plate comprising a plurality of scintillator elements formed in a two dimensional array, each of said scintillator elements being formed from scintillator material having a high atomic number, having polished side surfaces, a polished incident end face for receiving incident radiation, and an output end face for emitting scintillation light in response to incident radiation; and
a light incident position detecting tube having a photocathode opposite to said output end faces and being substantially coextensive therewith, said photocathode for emitting electrons in response to said scintillation light emitted from said output end faces of said plurality of scintillator elements, said photoelectrons being emitting from locations on said photocathode corresponding to the positions of said scintillator elements in said plate which interact with said radiation.

2. A position-sensitive radiation detector comprising:
a scintillator plate comprising a plurality of scintillator elements formed from scintillator material having a high atomic number and having polished side surfaces, a roughly-ground incident end face for receiving incident radiation, and a polished output end face for emitting scintillation light in response to radiation incident upon said incident end face;
a light incident position detecting tube having a photocathode opposite to said output end faces for emitting photoelectrons in response to said scintillation light emitted from said output end faces of said plurality of scintillator elements, said photoelectrons being emitted from locations on said photocathode corresponding to the position of said scintillator elements in said plate which receive said radiation;
a photomultiplier for multiplying said emitted electrons;
an incident electron detecting unit for receiving said electrons from said photomultiplier and for outputting a position signal representing in two dimensions the generation position of said electrons emitted from said photocathode; and
an arithmetic unit for processing said position signal to generate a distribution output indicating the position and intensity of radiation incident upon said scintillator plate.

3. A device according to claim 1 or 2 wherein each of said scintillator elements comprises a quadrangular prism.

4. A device according to claim 1 or 2 wherein each of said scintillator elements comprises bismuth germanium oxide or gadolinium silicon oxide.

5. A device according to claim 1 or 2 wherein each of said side surfaces and end surfaces of said scintillator elements is polished to a mirror finish.

6. A device according to claim 5, wherein the other end face of each of said scintillator elements is roughly-ground.

7. A device according to claim 6, wherein said roughly-ground end surface of each of said scintillator elements is coated with reflection material.

8. A device according to claim 7, wherein said mirror-polished side surfaces and end surface of each of said scintillator elements are coated with reflection material.

9. A device according to claim 8, wherein said reflection material is barium sulfate.

10. A device according to claim 1 or 2, wherein each of said plurality of scintillator elements is faced to adjacent scintillator elements by radiation shielding members.

11. A device according to claim 10, wherein said radiation shielding members comprise tungsten plates.

12. A device according to claim 1 or 2 further comprising optical coupling means for optically coupling said output end face of each of said scintillator elements to said photocathode of said light incident position detecting tube.

13. A device according to claim 12, wherein said optical coupling means comprises a plurality of glass plates, each of said glass plates being separated from adjacent glass plates by an optical shielding member, having an area substantially equal to the area of an output end face of a scintillator element, and being associated with a different one of said plurality of scintillator elements.

14. A device according to claim 1 or 2, further comprising a plurality of spacers for joining adjacent scintillator elements such that air gaps are formed therebetween, each of said air gaps being smaller in refractive index than said scintillator elements.

15. A device according to claim 1 or 2, further comprising a transparent adhesive for joining adjacent scintillator elements, said transparent adhesive being smaller in refractive index than said scintillator elements.

16. A device according to claim 1 or 2 further comprising media interposed between adjacent scintillator elements, said media having a refractive index smaller than the refractive index of said scintillator element.

* * * * *